(12) United States Patent
Rego et al.

(10) Patent No.: US 10,451,893 B2
(45) Date of Patent: Oct. 22, 2019

(54) METHOD FOR DETERMINING AN OPTICAL EQUIPMENT

(71) Applicant: ESSILOR INTERNATIONAL (COMPAGNIE GENERALE D'OPTIQUE), Charenton-le-Pont (FR)

(72) Inventors: Carlos Rego, Charenton-le-Pont (FR); Olivier Roussel, Charenton-le-Pont (FR); Berangere Granger, Charenton-le-Pont (FR); Loic Quere, Charenton-le-Pont (FR); Cedric Begon, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 760 days.

(21) Appl. No.: 14/896,093

(22) PCT Filed: Jun. 6, 2014

(86) PCT No.: PCT/EP2014/061854
§ 371 (c)(1),
(2) Date: Dec. 4, 2015

(87) PCT Pub. No.: WO2014/195471
PCT Pub. Date: Dec. 11, 2014

(65) Prior Publication Data
US 2016/0124246 A1 May 5, 2016

(30) Foreign Application Priority Data

Jun. 7, 2013 (EP) .................................... 13305763

(51) Int. Cl.
*G02C 7/02* (2006.01)
*G02C 13/00* (2006.01)
(Continued)

(52) U.S. Cl.
CPC ............. *G02C 7/027* (2013.01); *B29D 12/02* (2013.01); *G02C 5/008* (2013.01); *G02C 7/028* (2013.01); *G02C 13/003* (2013.01); *B33Y 80/00* (2014.12)

(58) Field of Classification Search
CPC ............ G02C 5/00; G02C 7/027; B29D 12/02
See application file for complete search history.

(56) References Cited

U.S. PATENT DOCUMENTS

| 4,762,407 A | 8/1988 | Anger et al. |
| 6,692,127 B2 * | 2/2004 | Abitbol ................ G02C 13/003 345/419 |

(Continued)

FOREIGN PATENT DOCUMENTS

| CN | 102317944 A | 1/2012 |
| DE | 1 02009 004380 A1 | 7/2010 |

(Continued)

OTHER PUBLICATIONS

Japanese Office Action issued in Application No. 2016-517624, dated Jan. 23, 2018 with English Translation.

(Continued)

*Primary Examiner* — Mark A Connolly
(74) *Attorney, Agent, or Firm* — Young & Thompson

(57) ABSTRACT

Method implemented by computer for determining an optical equipment including at least an optical lens and a spectacle frame, the lens being adapted to be mounted in the frame, the method including:
  a wearer data providing step, during which wearer data relating to the wearer's optical requirements is provided,
  an optical cost function providing step, during which an optical cost function is provided, the optical cost function relating to the optical function of the lens, (Continued)

Figure 1:
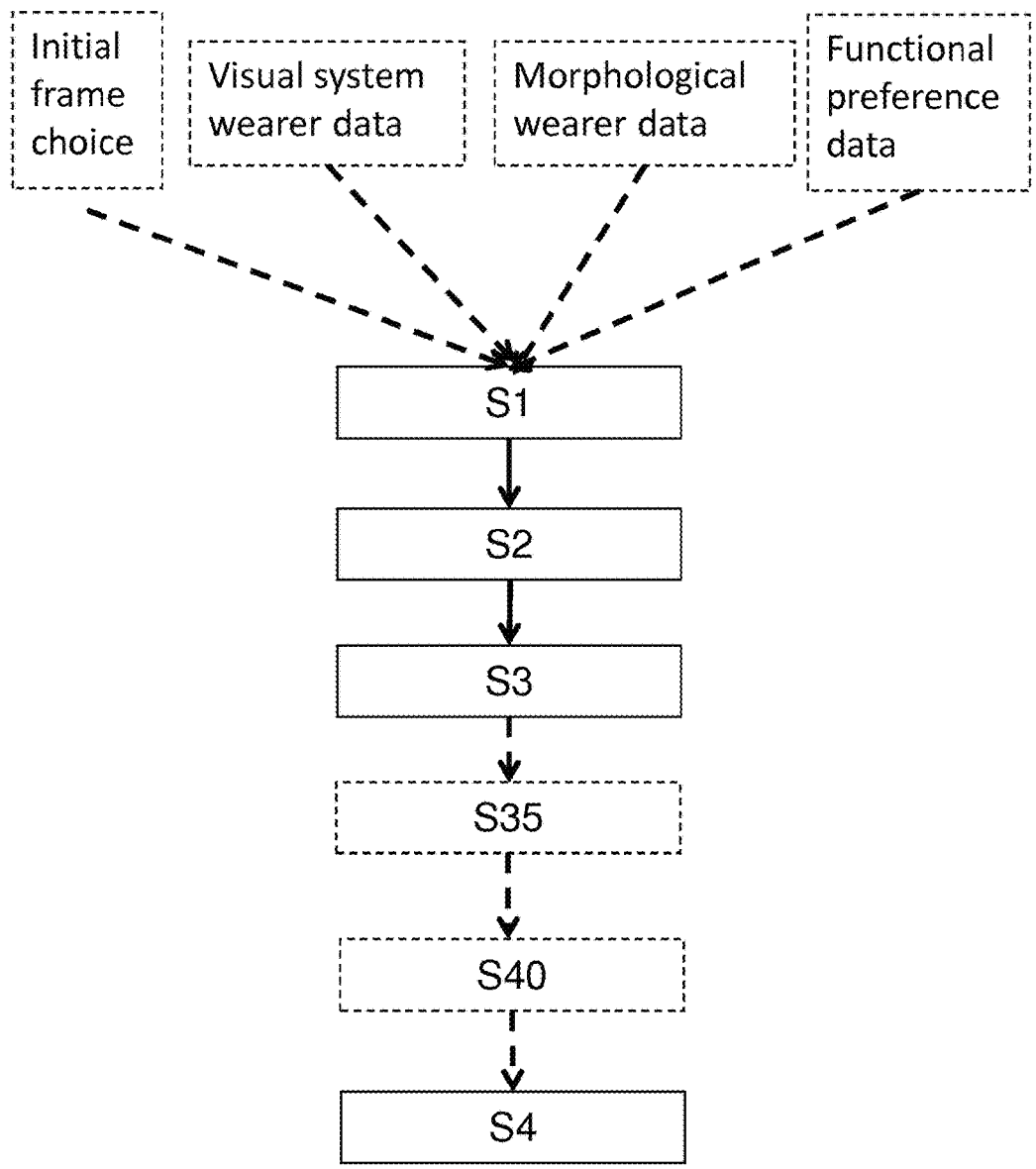

a comfort cost function providing step, during which a comfort cost function is provided, the comfort cost function relating to the weight of the optical equipment, an optical equipment determining step, during which the optical equipment that minimizes the difference between a global cost function and a target value of the global cost function is determined, the global cost function being a weighted sum of the optical and comfort cost functions.

26 Claims, 3 Drawing Sheets

(51) Int. Cl.
*B29D 12/02* (2006.01)
*G02C 5/00* (2006.01)
*B33Y 80/00* (2015.01)

(56) References Cited

U.S. PATENT DOCUMENTS

| | | | |
|---|---|---|---|
| 9,429,773 B2* | 8/2016 | Ben-Shahar | G02C 13/003 |
| 9,804,410 B2* | 10/2017 | Ben-Shahar | G02C 1/00 |
| 2007/0002444 A1 | 1/2007 | Piers et al. | |
| 2007/0046889 A1* | 3/2007 | Miller | G02C 3/003 |
| | | | 351/62 |
| 2007/0236650 A1* | 10/2007 | Jain | G02C 3/003 |
| | | | 351/41 |
| 2011/0109873 A1* | 5/2011 | Ogren | G02C 5/16 |
| | | | 351/123 |
| 2013/0179297 A1 | 7/2013 | Yamakaji | |
| 2013/0314666 A1* | 11/2013 | Wietschorke | G02C 7/027 |
| | | | 351/159.52 |
| 2015/0055085 A1* | 2/2015 | Fonte | G06Q 30/0621 |
| | | | 351/178 |

FOREIGN PATENT DOCUMENTS

| | | |
|---|---|---|
| EP | 2 161 611 A1 | 3/2010 |
| JP | 07-2811137 A | 10/1995 |
| JP | 2003-140095 A | 5/2003 |
| JP | 2005-121753 A | 5/2005 |
| JP | 2007-531610 A | 11/2007 |
| JP | 2012-514227 A | 6/2012 |
| WO | 01/88654 A2 | 11/2001 |
| WO | 2010/076294 A1 | 7/2010 |
| WO | 2012/014810 A1 | 2/2012 |

OTHER PUBLICATIONS

International Search Report, dated Aug. 1, 2014, from corresponding PCT application.

* cited by examiner

METHOD FOR DETERMINING AN OPTICAL EQUIPMENT

The invention relates to a method for determining an optical equipment comprising at least an optical lens and a spectacle frame, the optical lens being adapted to be mounted in the spectacle frame, a method of providing an optical equipment, a computer program product and a computer readable medium.

The discussion of the background of the invention herein is included to explain the context of the invention. This is not to be taken as an admission that any of the material referred to was published, known or part of the common general knowledge at the priority date of any of the claims.

Usually, a person needing to wear spectacles and having thus a prescription filled by an ophthalmologist or optometrist goes to the shop of an optician for choosing the spectacle frame of the future optical equipment. The future wearer of the optical equipment may try several spectacle frames and finally chooses one of the tried spectacle frames. The optician orders a pair of optical lenses corresponding to the prescription.

The pair of optical lenses sent to the optician are designed and manufactured according to optical criteria.

Recent improvements in the field of ophthalmic lenses, have allowed providing customized optical lenses, such customization going beyond the simple wearer's prescription. Further parameters than the wearer's prescription may be considered when designing and manufacturing the pair of ophthalmic lenses. For example, parameters related to the chosen spectacle frame can be considered.

Upon receipt of the pair of ophthalmic lenses, the optician needs to fit the received ophthalmic lens to the spectacle frame chosen by the wearer.

The spectacle frames are usually designed for a standard wearer and need to be adjusted to the wearer and the provided optical lenses.

In particular, most of the spectacle frames are designed assuming wearers have perfectly symmetrical faces and optical lenses. In particular, the shapes of the pad, bridge and sides of the spectacle frame are usually perfectly symmetrical.

However, most wearers are not perfectly symmetrical.

Furthermore, some wearers may have different ophthalmic prescription for the right and left eyes. Thus, the weight and thickness of the right and left optical lenses may be different.

Furthermore, the morphology may vary between different populations, for example the shape of the nose can significantly vary across different populations.

Furthermore, depending on the wearers skin, the wearer may have different sensitivity to friction due to the spectacle frame.

Therefore the optical equipment may be unstable and uncomfortable if adjustment operation is not carried out in an attempt to compensate for the asymmetries and imbalances resulting from these factors.

The optician generally adjusts manually or by using tools the spectacle frame, generally by deformation, including torsion. The bridge and the sides of the spectacle frame may be deformed to adjust the spectacle frame to the morphology of the wearer.

Besides the fact that it is time-consuming, this process has several drawbacks.

Being performed after having fitted the optical lenses (optical lenses presence alters the mechanical balance of the equipment on the wearer's face, it is difficult to anticipate the outcome with an empty spectacle frame or presentation optical lenses):

It significantly disrupts the proper installation of the ideal port settings that were provided ab initio, It introduces additional mechanical stress on the optical lenses, which significantly increases the risk of fracturing the mineral and/or organic coatings that may be present on the lenses, It introduces mechanical stresses in the elements of the frame, particularly the mobile parts, such as the joint or hinge, deformation of the spectacle frame may affect its appearance (destruction of symmetry change of the original curves of the model), an the rudimentary means employed (pliers, heaters) can alter the aesthetics of the product (scratches, discoloration), specific needs of maintaining the frame that can be linked to specific activity of the wearer (common port with the head bent forward, shaking) may not be taken into account, The aesthetics of the frame on the wearer's face is altered because of the deformation, the wearer can then be very disappointed with the final result as far from what he had originally chosen.

In addition, the comfort felt by the wearer is very likely to be non optimal due to limited congruence between his/her facial morphology and the way the optical equipment is maintained onto his/her face.

Therefore, there is a need for a method for providing to a wearer an optical equipment comprising at least an optical lens and a spectacle frame adapted that would perfectly fit the wearer so that the optician would not be require to deform the spectacle frame so as to adjust to the wearer and so as to provide a globally optimized optical equipment ensuring the best accessible optical, comfort and aesthetical result. Furthermore there is also a need to define and provide the adapted manufacturing means in order to produce such a globally optimized optical equipment.

A goal of the present invention is to provide such a method.

To this end, the invention proposes a method, for example implemented by computer means, for determining an optical equipment comprising at least an optical lens and a spectacle frame, the optical lens being adapted to be mounted in the spectacle frame, the method comprising:

a wearer data providing step, during which wearer data relating at least to the wearer's optical requirements are provided, an optical cost function providing step, during which an optical cost function is provided, the optical cost function being related to the optical function of the at least one optical lens and being defined based at least on part of the wearer data, a comfort cost function providing step, during which a comfort cost function is provided, the comfort cost function being related at least to the weight of the optical equipment, an optical equipment determining step, during which the optical equipment that minimizes the difference between a global cost function and a target value of the global cost function is determined, the global cost function being a weighted sum of the optical and the comfort cost functions.

The method according to the invention determines both the optical lenses and the spectacle frame so as to provide an optical equipment adapted to the wearer.

According to the method of the invention, not only the optical lenses but also the spectacle frame is determined according at least to an optical criteria, via the optical cost function, and a comfort criteria, via the comfort cost function.

Advantageously, the optical equipment determined by the method of the invention provides an optical function and weight repartition and total weight adapted to the wearer.

According to further embodiments which can be considered alone or in any possible combination:
- the method further comprises:
  - an initial optical equipment providing step, during which an initial optical equipment comprising at least one initial optical lens and an initial spectacle frame is provided, the initial optical lens being adapted to the wearer's optical requirements and the initial spectacle frame corresponding for instance to the type of spectacle frame chosen by the wearer,
  - a working optical equipment defining step, during which a working optical equipment is defined to be equal to the initial optical equipment,
  - a global cost function evaluation step during which the global cost function is evaluated,
  - a modifying step, during which the working optical equipment is modified, the evaluation and modifying steps are repeated so as to minimize the
  - difference between the global cost function and a target value of the global cost function; and/or
- the weight coefficient of both the optical and comfort cost functions are different from zero; and/or
- the comfort cost function relates to the mechanical forces applied by the optical equipment to the wearer when the optical equipment is worn by the wearer; and/or
- the comfort cost function is provided so as to be minimum when a friction forces and/or a clamping force between the spectacle frame and at least a contact zone of the spectacle frame with the wearer when the optical equipment is worn by the wearer reaches a given value; and/or
- the comfort cost function is provided so as to be minimum when the difference of weight of the optical equipment between the right and left sides corresponds to a weight difference predetermined value; and/or
- the comfort cost function is provided so as to be minimum when the weight distribution supported by head and/or face contact zones with the optical equipment when the optical equipment is worn by the wearer corresponds to a first weight distribution predetermined value; and/or
- the comfort cost function is provided so as to be minimum when the difference of weight of the optical equipment supported by the nose of the wearer and the pinna of the wearer corresponds to a second weight distribution value; and/or
- the first and/or second predetermined values are determined according to a postural preferential use of the optical equipment; and/or
- the comfort cost function is provided so as to be minimum when the weight of the optical equipment is minimum; and/or
- the wearer data comprise functional preference data related to optical lens functions sensitive to optical lens geometry and/or positioning with respect to the wearer's face; and/or
- functional preference data refer to desired filtering properties such as transmission and/or absorption and/or reflexion properties of the optical lens; and/or
- the wearer data comprises morphological wearer data related to the morphology of the head and/or face contact zones with the optical equipment when the optical equipment is worn by the wearer, and the comfort cost function is related to the mechanical forces applied by the optical equipment to said contact zones; and/or
- the morphology data relates to the shape and position of the nose and/or of the pinna and/or of the temporal zones of the wearer; and/or
- during the modifying step,
  - the material or different materials of the optical lens, including the different coating that may be applied to the optical lens, and/or
  - at least one of the optical surfaces of the optical lens, and/or
  - the relative position of the optical surfaces of the optical lens, and/or
  - the material or different materials of the spectacle frame, and/or
  - the weight distribution of the spectacle frame, and/or
  - the weight distribution of the optical lens, and/or
  - the shape of the spectacle frame, and/or
  - the shape of the optical lens,
  - is modified; and/or
- the method further comprises a manufacturing device data providing step during which the manufacturing device data identifying the manufacturing devices available to manufacture the optical equipment is provided, and during the modifying step, the optical equipment is modified considering the technical possibility of the manufacturing devices identified by the manufacturing data; and/or
- the wearer data comprises morphology data related to the morphology of the wearer,
  - the method further comprises an esthetic cost function providing step, during which an esthetic cost function is provided, the esthetic cost function being related to the horizontality of the optical equipment when worn by the wearer, and
  - the global cost function is a weighted sum of the optical, the comfort and the esthetic cost functions; and/or
- the esthetic cost function further relates to a symmetrical distribution with respect to the central vertical axis of the wearer's face of the optical equipment about the wearer face when worn by the wearer; and/or
- the method further comprises a mechanical robustness cost function providing step, during which a mechanical robustness cost function is provided, and
  - the global cost function is a weighted sum of the optical, the comfort and the mechanical robustness cost functions; and/or
- at least part of the optical equipment is intended to be manufactured using an additive manufacturing method; and/or
- the additive manufacturing method comprises after the optical equipment determining step, a construction strategy determining step which comprises at least one of the following steps:
  - the determination of the geometries and locations of voxels
  - the determination of the geometries and locations of slices made of a plurality of voxels,
  - the determination of the orientation of the global arrangement of voxels and/or slices in the referential of the additive manufacturing equipment(s).
  - the determination of the order according to which the voxels and/or slices are to be manufactured; and/or
- at least part of the spectacle frame is intended to be manufactured using an additive manufacturing method, and the spectacle frame of the optical equipment determined during the optical equipment determining step is made of different materials, the choice and repartition of the different material is done so as to minimize the difference between the global cost function and a target value of the global cost function; and/or at least part of the spectacle frame is intended to be manufactured using an additive manufacturing method, and the spectacle frame of the optical equipment determined during the optical equipment determining step comprises at least one internal cavity determined so as to minimize the difference between the global cost function and a target value of the global cost function; and/or at least part of the optical equipment comprises a functionally graded material intended to be manufactured using an additive manufacturing method.

The invention further relates to a method of providing an optical equipment to a wearer comprising the steps of:

determining an optical equipment according to any of the preceding claims and manufacturing the determined optical equipment.

According to further embodiments which can be considered alone or in any possible combination:

at least part of the determined optical equipment is manufactured using an additive manufacturing method; and/or the additive manufacturing method is selected in the list consisting of stereolithography, mask stereolithography or mask projection stereolithography, polymer jetting, scanning laser sintering or SLS, scanning laser melting or SLM, fused deposition modeling or FDM.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Figure 2:
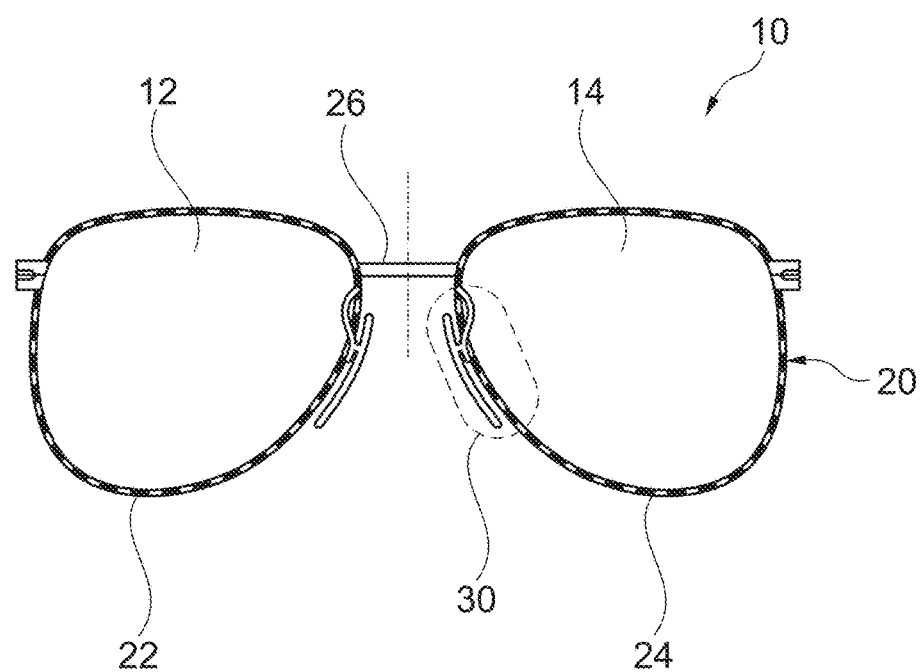
Figure 3:
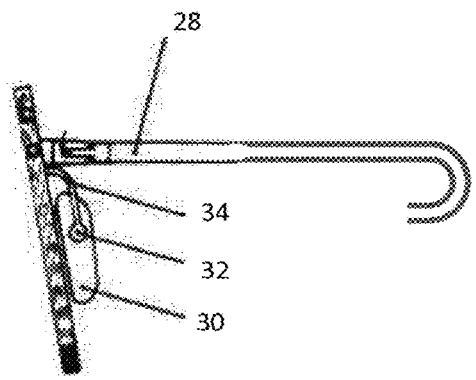
Figure 4:
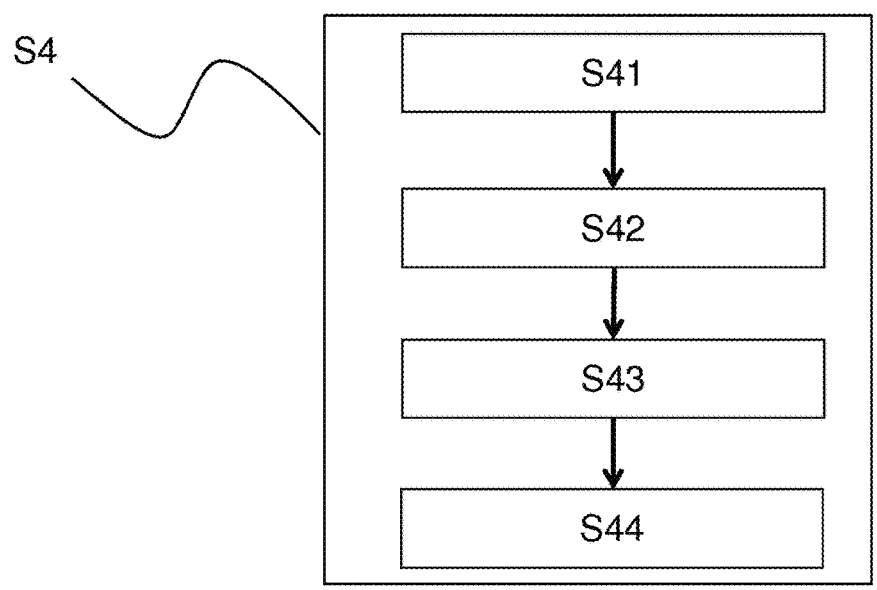

Non limiting embodiments of the invention will now be described with reference to the accompanying drawings in which:

FIG. 1 is flowchart representing the steps of a method according to an embodiments of the invention, FIG. 2 is a schematic front view of a spectacle frame, FIG. 3 is a schematic side view of the spectacle frame represented on FIG. 2, and FIG. 4 is a flowchart representing steps of part of the method according to an embodiment of the invention.

In the framework of the invention, the following terms have the meaning indicated herein below.

The term "optical lens" is to be understood to mean any type of known lens intended to be supported by a wearer's face. The term can refer to ophthalmic lenses such as corrective lenses, non-corrective lenses, semi-finished lenses, such as progressive addition lenses, unifocal or multifocal lenses. The term can also refer to said ophthalmic lenses which could present at least one added value such as, for example, tint, photochromism, polarization filtering, electrochromism, antireflective properties, antiscratch properties . . . .

The term "optical equipment" is to be understood to mean any type of known eyeglasses comprising a spectacle frame and at least an optical lens. The optical equipment may comprise a single optical lens covering either both eyes of the wearer, for example goggles or masks, or only one eye, for example a head mounted display. The optical equipment may comprise two optical lenses each covering an eye of the wearer as represented on FIG. 2. The term can refer to ophthalmic optical equipment, non-ophthalmic optical equipment, sunglasses, glasses for sporting applications such as goggles, reading glasses, protective glasses, driving glasses.

The term 'prescription' is to be understood to mean a set of optical characteristics of optical power, of astigmatism, of prismatic deviation, and, where relevant, of addition, determined by an ophthalmologist or optometrist in order to correct the vision defects of the wearer, for example by means of a lens positioned in front of his eye. For example, the prescription for a progressive addition lens comprises values of optical power and of astigmatism at the distance-vision point and, where appropriate, an addition value. The prescription data may include data for emmetrope eyes.

The term weight is to be understood as the weight of the object itself (as described for example in the international standard ISO 80000-4 (2006)), and the reparation of said weight in the object.

According to an embodiment of the invention illustrated on FIG. 1, the method, for example implemented by computer means, for determining an optical equipment comprising at least an optical lens and a spectacle frame, the optical lens being adapted to be mounted in the spectacle frame, comprises:

a wearer data providing step S1,
an optical cost function providing step S2,
a comfort cost function providing step S3, and
an optical equipment determining step S4.

FIG. 2 represents an example of an optical equipment that may be determined using a method according to the invention.

As represented on FIG. 2, the optical equipment 10 may comprise a pair of optical lenses 12, 14 and a spectacle frame 20. The spectacle frame 20 comprises rims 22, 24 in which the optical lenses 12 and 14 are to be mounted. The rims 22 and 24 of the spectacle frame 20 are linked by a bridge 26.

The spectacle frame comprises sides 28 or temples and pads 30 so as to maintain the spectacle frame on the wearer.

As represented on FIG. 3, each pad 30 may be linked to the rims 22 and 24 via a stud 32 and a pad arm 34.

The sides 28 are linked to the rims 22 and 24 by joints by one end of the side, the other end being arranged so as to be in contact with the wearer's pinna.

During the wearer data providing step S1, wearer data relating at least to the wearer's optical requirements are provided.

The wearer's optical requirements comprise all type of requirements of the wearer relating to the optical features of the optical equipment. For example, the optical requirement may comprise ophthalmic requirements and/or filtration requirements such as transmission function requirements and/or reflection function requirements, and/or absorption function requirements.

As illustrated in FIG. 1, the wearer data may include initial frame choice data, visual system wearer data, morphological wearer data and functional preference data.

In the sense of the invention, initial frame data relate to an initial chosen spectacle frame.

In the sense of the invention, the visual system wearer data relate to necessary data to design the optical lens. The visual system wearer data may be chosen from, but not limited to the list comprising: the wearer's prescription and/or the head/eye movement strategy of the wearer, and/or the wear conditions.

In the sense of the invention, functional preference data relate to optical lens functions sensitive to optical lens geometry and/or positioning with respect to the wearer's face. More particularly, functional data relate to the position and the orientation of the lens relative to the axis of sight of the wearer and/or the curvature of the front and rear faces of the optical lens and/or boxing lens data.

In an embodiment, functional preference data can refer to desired filtering properties such as transmission and/or absorption and/or reflexion properties of the optical lens. For example, the optical lens shall have a desired level of UV-protection, a desired gradient of transmission.

Furthermore, in the sense of the invention, morphological wearer data relate to any anatomical features of the wearer's face and head.

The morphological wearer data may include:

eye features such as the interpupillary distance of the wearer, the position of the center of rotation of each eye of the wearer and anatomical surface features of the eye and/or eyelids (for example, the medial angle, the lateral angle, the medial commissure, the lateral commissure, the medial canthus, the lateral canthus, the lacarimal caruncle, the nasojugal fold, the lower eyelid margin, and the palperal fissure)

nose features such as shape and location of the nose, tip and/or side data of the nose and/or ear features such as shape and position of the pinna of the wearer, in particular the junction between the upper part of the pinna and the head and/or the wearer's complexion and/or lip features and/or temples or temporal zones features and/or eyebrow features and/or face features such as face shape (oval, round, rectangular, square, triangular), features of hairline, features of the area from the forehead to the check.

Advantageously, the morphological wearer data may include data on the head and face contact zones with the optical equipment and more particularly, the specific position and/or shape and/or spatial extension and/or orientation of the facial and head zones which support the mechanical contact with the optical equipment such as the temples and the sides of the nose, when the optical equipment is worn by the wearer.

These morphological wearer data can be provided by any known method such as a 3D scanning method and/or pictures of the wearer's face and profile.

During the optical cost function providing step S2, an optical cost function is provided. The optical cost function relates to the optical function of the at least one optical lens and the effect of the optical function on the visual system of the wearer.

The optical function may include customizing aspects such as depends according to the gazing direction or visual strategies. This also includes filtering properties as defined above.

The optical cost function may relate to the equations of the surfaces of the optical lens, the relative positions of such surfaces and the refractive index of the material(s) forming the optical lens.

Advantageously, such optical cost function can be used to optimize the holding of the optical lens in front of the eyes providing high optical quality for the wearer.

Such optical cost function may be defined according to morphological wearer data in addition to visual system wearer data.

In an embodiment, the morphological data can be related to the geometry and relative positions of the face and/or head zones which are to be in contact with the optical equipment, and the interpupillary distance of the wearer.

During the comfort cost function providing step S3, a comfort cost function is provided. The comfort cost function relating at least to the weight of the optical equipment.

In a first embodiment, the comfort cost function may directly relate to the total weight of the optical equipment. Indeed, generally the lighter the optical equipment is the more comfortable it may be considered. For example, the comfort cost function may be arranged so as to be minimum when the weight of the optical equipment is minimum.

The comfort cost function may also be arranged so as to consider the balance of weight between the front and back sides of the optical equipment and/or between the left and right sides.

For example, the comfort cost function is provided so as to be minimum when the difference of weight of the optical equipment between the right and left sides corresponds to a weight difference predetermined value.

The weight of the right and left side should be understood as the weight supported by the right and left side of the wearer when wearing the optical equipment.

The weight difference predetermined value may be set according to a postural preferential use of the optical equipment and/or morphological data of the wearer. For example, the weight difference predetermined value may be set to zero, so as to provide a balance of weight between the right and left sides of the optical equipment.

Advantageously, such comfort cost function can be used to compensate for a difference of weight between the right and left optical lenses. Thus, the pressure applied by the optical equipment on the wearer's pinna and nose may be balanced, providing a greater comfort to the wearer.

Furthermore, the comfort cost function is provided so as to be minimum when the weight distribution supported by head and/or face contact zones with the optical equipment corresponds to a first weight distribution predetermined value.

The first weight predetermined value may be set according to a postural preferential use of the optical equipment (standing head forward or back) and/or morphological wearer data such as the specific position and/or shape and/or spatial extension and/or orientation of the facial and head zones which support the mechanical contact with the optical equipment In an embodiment, the comfort cost function may be adapted so as to be minimum when the difference of weight of the optical equipment supported by the nose of the wearer and the pinna of the wearer corresponds to a second first weight predetermined value.

It is understood that in said embodiment, the head and/or face contact zones described herein before are represented by the nose and pinna of the wearer.

Regarding the second first weight predetermined value, it may be set to zero, so as to provide a balance of weight between the nose and the pinna of the wearer.

According to an embodiment of the invention, the first and/or second first weight predetermined values are determined according to a postural preferential use of the optical equipment.

According to a further embodiment, the comfort cost function is provided so as to be minimum when the weight of the optical equipment is minimum.

Advantageously, such comfort cost function can be used to adjust weight unbalance, for example due to heavy optical lenses or prescription differences between left and right eyes.

The comfort cost function may further relate to the different mechanical forces applied by the optical equipment to the wearer when the optical equipment is worn by the wearer in static or dynamic mode. In an embodiment, the comfort cost function relates to the mechanical forces applied by the optical equipment to the wearer when the optical equipment is worn by the wearer.

Morphological wearer data such as the shape and position of the nose and pinna of the wearer may be used to determine the forces applied by the optical equipment.

In an embodiment, among the different forces applying to the wearer when wearing the optical equipment, gravity, clamping forces and friction forces at the head and/or face contact zones with the optical equipment are of particular interest for the invention.

As illustrated previously, gravity is to be considered when considering the weight repartition of the optical equipment and more generally the total weight of the optical equipment.

For the clamping force, it is to be considered for the stiffness of the side and/or pads of the spectacle frame.

For example, the side of the optical equipment may apply a clamping force to the wearer's head. Reducing the clamping force helps increase the comfort of the optical equipment. However, a small clamping force may help maintaining the optical equipment.

Thus, the comfort cost function may be adapted so as to relate to the clamping force.

The friction forces at the contact zones may be considered when considering the weight repartition of the optical equipment and/or the stiffness of the side and/or pads of the spectacle frame and/or the type of material and surface of the parts of the spectacle frame to be in contact with the wearer.

The comfort cost function may further relate to the friction forces between the spectacle frame and the contact zones of the spectacle frame with the wearer when the optical equipment is worn by the wearer.

Indeed, such friction forces should not be too great, so as to avoid irritating the wearer's contact zones, but not too small so as to ensure that the optical equipment holds properly on the wearer.

Furthermore, it will be appreciated by one of skill in the art that the comfort cost function may also relate to parameters such as skin topology and/or roughness of the wearer, tendency to perspire, in combination or not with the mechanical forces.

Advantageously, by controlling said parameters and the morphological wearer data, the method according to the invention improves the holding of the optical equipment and the wearing comfort when the wearer is moving.

Advantageously, such comfort cost function can further be used to adjust the mechanical forces distribution applied to the head and/or face contact zones with the optical equipment.

In an embodiment, the comfort cost function is provided so as to be minimum when a friction forces and/or a clamping force between the spectacle frame and at least a contact zone of the spectacle frame with the wearer when the optical equipment is worn by the wearer reaches a given value.

By given value, we consider herein a value corresponding to a compromise between the mechanical forces repartition exerted by the optical equipment onto the wearer's face and/or head, and the subjective comfort feeling experienced by said wearer as to the quality with which the optical equipment is maintained onto his/her face and/or head.

According to an embodiment of the invention, the method further comprises an esthetic cost function providing step S35.

The esthetic cost function may relate to individual proper fit parameters of the optical equipment and/or wearer's aesthetic requirements or taste and/or impression ratings of the combination between the wearer morphology and the optical equipment.

Morphological wearer data may be used to determine such parameters in combination or not with hair style, hair color, eye color, spectacle frame color and/or wearer's preferences and style.

Face, eye, nose, temples and/or eyebrow features may be used as morphological wearer data.

Advantageously, the method according to the invention enables any user to obtain dedicated well fitting optical equipment.

In an embodiment, an esthetic cost function relating at least to the horizontality of the optical equipment when worn by the wearer is provided during the esthetic cost function providing step S35.

The esthetic cost function allows considering the horizontality of the optical equipments when worn by the wearer. Such horizontality appears to be an important esthetical criterion for most wearer's. Although most spectacle frames are symmetric, since most wearer's morphology is not perfectly symmetric, most optical equipment when worn by the wearer do not appear horizontal.

The horizontality may be defined by reference to the line joining the two pupil centers of the wearer or by reference to the line joining the nasal and temporal ends of the wearer's eyebrows, as for example disclosed in U.S. Pat. No. 5,576,778.

The esthetic cost function may be related to the angle between such defined lines and the line tangent to the upper part of the frame. Such angle is preferably smaller than or equal to 10°.

The esthetic cost function may further relate to the symmetrical distribution with respect to the central vertical axis of the wearer's face of the optical equipment about the wearer's face when worn by the wearer.

It is understood that central vertical axis represents an axis which is perpendicular to the horizontality as defined herein before and aligned onto a central face point that can be defined, for example, as the middle point of the segment joining the two wearer's eyes.

The esthetic cost function may further relate to the wearer's complexion.

According to an embodiment of the invention, the method further comprises a mechanical robustness cost function providing step S36.

The mechanical robustness of the optical equipment may be modelized, in particular with well known finite elements calculation techniques in order to ensure the mechanical features which are necessary for proper use and durability in normal wear conditions. Such a calculation can be performed on the basis of the precise information on geometry and material choice which may be contained in the CAD (Computer Aided Design) file describing the optical equipment or part of the optical equipment.

If production with an additive manufacturing technique is considered for the totality or part of the optical equipment, as described below, the data which are useful for the mechanical calculation can be derived from the ad-hoc file used in additive manufacturing equipments, containing precise description of the geometry to be built and the materials used for each voxel or volume element.

The calculation of the mechanical robustness of the optical equipment may be based on the durability and resistance criteria which are specified for frames in the international standard ISO 12870:2004 (E). It is understood that such criteria may be applied for the global optical equipment encompassing frames and lenses.

Along that line, the mechanical robustness cost function may be directly related to the ability of the optical equipment to comply with the durability and resistance criteria, in particular the criteria related to bridge deformation and mechanical endurance.

If needed, the test situations which are described in the standard ISO 12870:2004 (E) can be modelized numerically.

Alternatively, specific physical parameters such as flexure modulus or elongation at break may be used to specify the proper mechanical behaviour which is expected.

During the optical equipment determining step S4, the optical equipment that minimizes the difference between a global cost function and a target value of the global cost function is determined, the global cost function being a weighted sum of the optical, the comfort cost functions and optionally the esthetic cost function and the mechanical robustness cost function.

It should be noted that the optical, the comfort cost functions and optionally the esthetic cost function and the mechanical robustness cost function may be jointly optimised in so far as at least the comfort and the optical cost functions depend on a common set of morphological wearer data.

According to an embodiment of the invention, the method further comprises a manufacturing device data providing step S40 which takes place prior to step S4.

During the manufacturing device data providing step S40, manufacturing device data identifying the manufacturing devices available to manufacture the optical equipment is provided. Such manufacturing data may be used during the determining step by considering the technical possibility of the manufacturing devices identified by the manufacturing data.

For example the manufacturing possibly may be very different for an additive manufacturing device than for a subtractive manufacturing device. Advantageously, according to such embodiment, such technical difference may be considered during the determining step S4.

According to an embodiment represented on FIG. 4, the optical equipment determining step may comprise:
 an initial optical equipment providing step S41,
 a working optical equipment defining step S42,
 a global cost function evaluation step S43, and
 a modifying step S44.

During the initial optical equipment providing step, an initial optical equipment comprising at least one initial optical lens and an initial spectacle frame is provided, the initial optical lens being adapted to the wearer's optical requirements and the initial spectacle frame corresponding for instance to the type of spectacle frame chosen by the wearer. The wearer may have chosen a given spectacle frame or may have selected a spectacle frame via a digital representation of the spectacle frame. According to an alternative embodiment, the initial spectacle frame may be determined independently from the wearer.

A working optical equipment is defined during the working optical equipment defining step S42. The working equipment is defined to be equal to the initial optical equipment.

The global cost function corresponding to the working optical equipment is evaluated during the global cost function evaluation step S43.

The working equipment is modified during the modifying step S44.

During the modifying step S44, any of the following elements of the working optical equipment, which can be considered alone or in any possible combination, can be modified:
 the material or different materials of the optical lens, including the different coating that may be applied to the optical lens, and/or
 at least one of the optical surfaces of the optical lens, and/or the relative position of the optical surfaces of the optical lens, and/or the material or different materials of the spectacle frame, and/or the weight distribution of the spectacle frame, and/or the weight distribution of the optical lens and/or the shape of the spectacle frame, and/or the shape of the optical lens.

The evaluation and modifying steps are repeated so as to minimize the difference between the value of the global cost function and a target value.

The target value can be determined as a compromise between the optical/comfort criteria and the technical possibility offered either by the computer means and/or by the machining device.

According to an embodiment of the invention, the method according to the invention may be understood as a digital adjustment of the spectacle frame to offer best comfort and esthetic results to the wearer. However, since the modification is digital and is realized prior to the actual manufacturing to the optical lenses and/or spectacle frame, much more freedom is given to the modification than may apply the optician with the prior art methods resulting in a personalized comfort level which is out of reach with traditional means.

According to a particularly advantageous embodiment of the invention, at least part of the optical equipment is intended to be manufactured using an additive manufacturing method. By additive manufacturing we mean a manufacturing technology as defined in the international standard ASTM 2792-12, which mentions a process of joining materials to make objects from 3D model data, usually layer upon layer, as opposed to subtractive manufacturing methodologies, such as traditional machining.

The additive manufacturing method may be selected in, but is not limited to, the list consisting of stereolithography, mask stereolithography or mask projection stereolithography, polymer jetting, scanning laser sintering or SLS, scanning laser melting or SLM, fused deposition modeling or FDM.

Additive manufacturing technologies comprise processes which create objects by juxtaposition of volume elements according to a pre-determined arrangement that can be defined in a CAD (Computer Aided Design) file. Such a juxtaposition is understood as the result of sequential operations such as building a material layer on top of a previously obtained material layer and/or juxtaposing a material volume element next to a previously obtained volume element.

It is well known by the man skilled in the art that the determination of the voxels geometries and locations is the result of an optimized construction strategy that may take into account the order of the sequential manufacturing operations as related to the capabilities of the chosen additive manufacturing equipment.

The optimized construction strategy typically comprises:

the determination of the geometries and locations of voxels the determination of the geometries and locations of slices made of a plurality of voxels, the determination of the orientation of the global arrangement of voxels and/or slices in the referential of the additive manufacturing equipment(s).

the determination of the order according to which the voxels and/or slices are to be manufactured.

A 3D printing device that may be used for the invention, is adapted to juxtapose small elements of volume, also referred to as voxel, to build at least part of an optical equipment. Furthermore, the 3D printing device may be adapted to lay down successive layers of liquid, powder, paper or sheet material from a series of cross sections. These layers, which correspond to the virtual cross sections from the digital model, are polymerized or joined together or fused to create at least part of the optical equipment.

The primary advantage of this technique is its ability to create almost any shape or geometric feature. Advantageously, using such additive manufacturing method provides much more freedom during the determining step.

According to the invention, at least part of the optical equipment may be manufactured using an additive manufacturing method.

For example, the optical lens may be manufactured by additive manufacturing or some material may be added to either surface of the optical lenses using an additive manufacturing method.

For example, the optical lens of the optical equipment determined during the optical equipment determining step may be made of transparent materials of different densities.

The choice and repartition of the different materials is done so as to minimize the difference between the global cost function and a target value of the global cost function.

The choice and repartition of the different material may also be based on refractive index considerations, for example providing gradual refractive index optical lenses.

For example, the optical element may be made of the following materials:

(meth)acrylic or (meth)acrylate polymer based material and, for example, a photopolymer as the product marketed under the brand VeroClear™; and/or epoxy or thioepoxy polymer based material; and/or vinyl ether based material, and/or thiolene based material, and/or hyperbranched based material, and/or hybrid organic inorganic based material.

polycarbonate, polymethyl(meth)acrylate, polyamide, thiourethane polymers and/or episulfides based materials, or Furthermore, the material may comprise colloids, pigments or one or more dyes and/or nanoparticles configured to change its optical transmission and/or appearance and/or mechanical properties.

According to an embodiment of the invention, at least part of the spectacle frame is intended to be manufactured using an additive manufacturing method.

Advantageously, the spectacle frame of the optical equipment determined during the optical equipment determining step may be made of different materials.

The choice and repartition of the different material is done so as to minimize the difference between the global cost function and a target value of the global cost function. For example, material having different friction features or density may be used to increase the wearer's comfort.

The spectacle frame of the optical equipment determined during the optical equipment determining step may also comprise at least one internal cavity determined so as to minimize the difference between the global cost function and a target value of the global cost function.

Advantageously, the additive manufacturing method allows having at least part of the optical equipment comprises a functionally graded material intended to be manufactured using an additive manufacturing method.

By functionally graded material (FGM) it is understood a material made of a plurality of volume elements that may be characterized by the variation in composition and structure gradually over volume, resulting in corresponding changes in the physical and chemical properties of the material.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. Method implemented for determining an optical equipment, wherein:
    said optical equipment comprises at least an optical lens and a spectacle frame, the optical lens being mounted in the spectacle frame,
    the method comprising:
        a wearer data providing step, during which wearer data relating at least to the wearer's optical requirements are provided,
        an optical cost function providing step, during which an optical cost function is provided, the optical cost function being related to the optical function of the at least one optical lens and being defined based at least on part of the wearer data,
        a comfort cost function providing step, during which a comfort cost function is provided, the comfort cost function being related at least to the weight of the optical equipment,
        an optical equipment determining step, during which the optical equipment that minimizes the difference between a global cost function and a target value of the global cost function is determined, the global cost function being a weighted sum of the optical and the comfort cost functions,
        an initial optical equipment providing step, comprising providing an initial optical equipment comprising at least one initial optical lens and an initial spectacle frame, wherein the initial optical lens is adapted to the wearer's optical requirements and the initial spectacle frame,
        a working optical equipment defining step, during which a working optical equipment is defined to be equal to the initial optical equipment,
        a global cost function evaluation step during which the global cost function is evaluated, and
        a modifying step, during which the working optical equipment is modified,
        wherein the evaluation and modifying steps are repeated so as to minimize the difference between the global cost function and a target value of the global cost function.

2. The method according to claim 1, wherein the comfort cost function relates to the mechanical forces applied by the optical equipment to the wearer when the optical equipment is worn by the wearer.

3. The method according to claim 2, wherein the comfort cost function is provided so as to be minimum when a friction forces and/or a clamping force between the spectacle frame and at least a contact zone of the spectacle frame with the wearer when the optical equipment is worn by the wearer reaches a given value.

4. The method according to claim 1, wherein the comfort cost function is provided so as to be minimum when the difference of weight of the optical equipment between the right and left sides corresponds to a weight difference predetermined value.

5. The method according to claim 1, wherein the comfort cost function is provided so as to be minimum when the weight distribution supported by head and/or face contact zones with the optical equipment when the optical equipment is worn by the wearer corresponds to a first weight distribution predetermined value.

6. The method according to claim 5, wherein the comfort cost function is provided so as to be minimum when the difference of weight of the optical equipment supported by the nose of the wearer and the pinna of the wearer corresponds to a second weight distribution predetermined value.

7. The method according to claim 6, wherein the second weight distribution predetermined value is determined according to a postural preferential use of the optical equipment.

8. The method according to claim 5, wherein the first weight distribution predetermined value is determined according to a postural preferential use of the optical equipment.

9. The method according to claim 1, wherein the comfort cost function is provided so as to be minimum when the weight of the optical equipment is minimum.

10. The method according to claim 1, wherein the wearer data comprise functional preference data related to optical lens functions sensitive to optical lens geometry and/or positioning with respect to the wearer's face.

11. The method according to claim 10, wherein functional preference data refer to desired filtering properties such as transmission and/or absorption and/or reflexion properties of the optical lens.

12. The method according to claim 1, wherein the wearer data comprises morphological wearer data related to the morphology of the head and/or face contact zones with the optical equipment when the optical equipment is worn by the wearer, and the comfort cost function is related to the mechanical forces applied by the optical equipment to said contact zones.

13. The method according to claim 12, wherein the morphology data relates to the shape and position of the nose and/or of the pinna and/or of the temporal zones of the wearer.

14. The method according to claim 1, wherein the modifying step further comprises modifying at least one of:
    a material of the optical lens,
    a coating of the optical lens,
    at least one optical surface of the optical lens,
    a relative position of the optical surfaces of the optical lens,
    a material of the spectacle frame,
    a weight distribution of the spectacle frame,
    a weight distribution of the optical lens,
    a shape of the spectacle frame, and
    a shape of the optical lens.

15. The method according to claim 1, wherein the method further comprises:
    a manufacturing device data providing step during which the manufacturing device data identifying the manufacturing devices available to manufacture the optical equipment is provided, and a modifying step, wherein the optical equipment is modified considering the technical possibility of the manufacturing devices identified by the manufacturing data.

16. The method according to claim 1, wherein
the wearer data comprises morphology data related to the morphology of the wearer,
the method further comprises an esthetic cost function providing step, during which an esthetic cost function is provided, the esthetic cost function being related to the horizontality of the optical equipment when worn by the wearer, and
the global cost function is a weighted sum of the optical, the comfort and the esthetic cost functions.

17. The method according to claim 16, wherein the esthetic cost function further relates to a symmetrical distribution with respect to the central vertical axis of the wearer's face of the optical equipment about the wearer face when worn by the wearer.

18. The method according to claim 1, wherein the method further comprises a mechanical robustness cost function providing step, during which a mechanical robustness cost function is provided and
the global cost function is a weighted sum of the optical, the comfort and the mechanical robustness cost functions.

19. The method according to claim 1, further comprising manufacturing at least part of the optical equipment determined during the optical equipment determining step using an additive manufacturing method.

20. The method according to claim 19, wherein the additive manufacturing method comprises after the optical equipment determining step, a construction strategy determining step which comprises at least one of the following steps:
the determination of the geometries and locations of voxels
the determination of the geometries and locations of slices made of a plurality of voxels,
the determination of the orientation of the global arrangement of voxels and/or slices in the referential of the additive manufacturing equipment(s),
the determination of the order according to which the voxels and/or slices are to be manufactured.

21. The method according to claim 1, further comprising:
manufacturing at least part of the spectacle frame using an additive manufacturing method,
choosing and repartitioning different materials of the spectacle frame so as to minimize a difference between the global cost function and a target value of the global cost function, and
making the spectacle frame of the optical equipment from the chosen and repartitioned different materials.

22. The method according to claim 1, further comprising:
manufacturing at least part of the spectacle frame using an additive manufacturing method, and
determining at least one internal cavity so as to minimize the difference between the global cost function and a target value of the global cost function,
wherein the spectacle frame of the optical equipment determined during the optical equipment determining step comprises the at least one internal cavity determined so as to minimize the difference between the global cost function and a target value of the global cost function.

23. The method according to claim 1, further comprising:
manufacturing a functionally graded material using an additive manufacturing method,
wherein at least part of the optical equipment comprises a functionally graded material.

24. Method of providing an optical equipment to a wearer comprising the steps of:
determining an optical equipment according to claim 1 and
manufacturing the determined optical equipment.

25. The method according to claim 24, wherein at least part of the determined optical equipment is manufactured using an additive manufacturing method.

26. The method according to claim 25, wherein the additive manufacturing method is selected in the list consisting of stereolithography, mask stereolithography or mask projection stereolithography, polymer jetting, scanning laser sintering or SLS, scanning laser melting or SLM, fused deposition modeling or FDM.

* * * * *